(12) United States Patent
Frederiksen et al.

(10) Patent No.: US 11,022,691 B2
(45) Date of Patent: Jun. 1, 2021

(54) 3-D LIDAR SENSOR

(71) Applicant: Robert Bosch GmbH, Stuttgart (DE)

(72) Inventors: Annette Frederiksen, Renningen (DE); Axel Buettner, Stuttgart (DE); Hans-Jochen Schwarz, Stuttgart (DE); Jan Sparbert, Rutesheim (DE); Joem Ostrinsky, Ditzingen (DE); Klaus Stoppel, Mundelsheim (DE); Mustafa Kamil, Leonberg (DE); Siegwart Bogatscher, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 16/342,686

(22) PCT Filed: Oct. 2, 2017

(86) PCT No.: PCT/EP2017/074980
§ 371 (c)(1),
(2) Date: Apr. 17, 2019

(87) PCT Pub. No.: WO2018/072986
PCT Pub. Date: Apr. 26, 2018

(65) Prior Publication Data
US 2020/0049824 A1 Feb. 13, 2020

(30) Foreign Application Priority Data
Oct. 19, 2016 (DE) ..................... 10 2016 220 504.8

(51) Int. Cl.
*G01S 17/42* (2006.01)
*G01S 7/481* (2006.01)
(Continued)

(52) U.S. Cl.
CPC ............ *G01S 17/42* (2013.01); *G01S 7/4813* (2013.01); *G01S 7/497* (2013.01); *G01S 17/931* (2020.01)

(58) Field of Classification Search
CPC ........ G01S 17/42; G01S 7/4813; G01S 7/497; G01S 17/931; G01S 2007/4975; G01S 7/4811
See application file for complete search history.

(56) References Cited

U.S. PATENT DOCUMENTS

| 3,739,174 A | 6/1973 | Gloge |
| 5,623,334 A | 4/1997 | Cho et al. |

(Continued)

FOREIGN PATENT DOCUMENTS

| DE | 4340756 | 6/1994 |
| DE | 102009027797 | 5/2010 |

(Continued)

OTHER PUBLICATIONS

International Search Report dated Mar. 28, 2018 of the corresponding International Application PCT/EP2017/074980 filed Oct. 2, 2017.

*Primary Examiner* — Marthe Y Marc-Coleman
(74) *Attorney, Agent, or Firm* — Norton Rose Fulbright US LLP; Gerard Messina

(57) ABSTRACT

A 3-D lidar sensor, in particular, for motor vehicles, includes a laser beam source, an optical receiver and a scanning system for deflecting a laser beam generated by the laser beam source in two scanning directions perpendicular to each other; to increase the functionality, a further detection device for deviations from normal operation being provided in the 3-D lidar sensor. In addition, a corresponding method for operating the 3-D lidar sensor is provided.

17 Claims, 6 Drawing Sheets

(51) Int. Cl.
*G01S 7/497* (2006.01)
*G01S 17/931* (2020.01)

(56) References Cited

U.S. PATENT DOCUMENTS

| | | |
|---|---|---|
| 2004/0257556 A1 | 12/2004 | Samukawa et al. |
| 2005/0205672 A1 | 9/2005 | Ando et al. |
| 2005/0205764 A1 | 9/2005 | Hoashi |
| 2011/0216304 A1* | 9/2011 | Hall ................ G01S 7/4813 356/4.01 |
| 2014/0063232 A1* | 3/2014 | Fairfield ............. B60T 7/18 348/118 |
| 2014/0125990 A1 | 5/2014 | Hinderling et al. |
| 2017/0307759 A1* | 10/2017 | Pei ................... H04N 13/239 |

FOREIGN PATENT DOCUMENTS

| | | |
|---|---|---|
| DE | 102015200224 | 7/2016 |
| EP | 1659421 | 5/2006 |
| JP | H0659038 A | 3/1994 |
| JP | H06214027 A | 8/1994 |
| JP | H0935176 A | 2/1997 |
| JP | 2005257322 A | 9/2005 |
| JP | 2008058173 A | 3/2008 |
| JP | 2015078941 A | 4/2015 |
| JP | 2016136090 A | 7/2016 |

* cited by examiner a)

b)

3-D LIDAR SENSOR

FIELD OF THE INVENTION

The present invention relates to a 3-D lidar sensor, in particular, for motor vehicles, including a laser beam source, an optical receiver and a scanning system for deflecting a laser beam generated by the laser beam source in two scanning directions perpendicular to each other.

BACKGROUND INFORMATION

Such a 3-D lidar sensor is discussed in the publication DE 10 2015 200 224 A1 originating from the applicant. For example, laser beams of suitable intensity, having a wavelength between 850 and 1500 nm, are used in order to prevent danger to persons due to the laser beams. To deflect the laser beam, e.g., a micromirror actuator or a MEMS (microelectromechanical system) is used for guiding the laser beam in the desired direction. If a transit-time measurement of the laser beam, which is emitted, reflected at an object, and received again by the optical receiver, is also carried out, then a three-dimensional image of the surrounding area may be acquired and interpreted by corresponding evaluation devices and/or driver assistance systems. Thus, inter alia, a driver of the motor vehicle may be made aware of stationary or mobile obstacles in the roadway, in order to prevent a collision. Such a 3-D lidar sensor is normally situated in a housing, which is equipped with an exit aperture in the form of a disk or lens for the laser beam.

SUMMARY OF THE INVENTION

An object of the present invention is to provide a 3-D lidar sensor having improved functionality and reliability, which is suitable, in particular, for motor vehicles. A corresponding method for operating the 3-D lidar sensor shall also be provided.

This object of the present invention may be achieved by providing, in or on the 3-D lidar sensor, a further detection device for deviations from normal operation. In this context, the detection device may actually be configured as desired, but may be as described in the following. This detection device may also be referred to as an "intelligent plane," which is situated in or on the sensor, that is, for example, in the transmitting and/or receiving path of the laser beam of the sensor. This plane may be situated, for example, in the interior of a housing of the sensor or at the exit aperture.

Advantageous further refinements and embodiments of the present invention are delineated in the further descriptions herein.

Detection of the emission direction of the laser beam may be provided at reference points. For example, additional light sensors, which do not have to be irradiated during normal operation of the laser and the scanning system, are situated on an intermediate plane and/or at the exit aperture. However, if this occurs, it may automatically be determined that the laser and/or the scanning system are out of alignment, and a corresponding error message may be outputted, and/or self-calibration of the entire system is carried out. In the same manner, it may be provided that the light sensors have to be irradiated during normal operation. If this does not occur, then misalignment may automatically be inferred. This may be implemented in the form of laser light detectors, which are situated, for example, at the edge of the exit aperture or in the region of a so-called intermediate plane. Consequently, it may be determined whether the emitted laser beam is also actually transmitted in the desired direction. This direction may be changed, inter alia, by mechanical/thermal effects, such as by thermal expansion of the housing of the 3-D lidar sensor or of the distance of the micromirror from a microlens array. In addition, the entire sensor may be mechanically out of alignment, e.g., due to a collision of the motor vehicle. Also, the laser itself may exhibit thermal drift during continuous operation, e.g., a laser delay after a trigger pulse.

In the same manner, it may be discerned if the exit aperture is dirty, e.g., by providing, in the interior of the sensor housing, a detection device, such as a scattered light sensor for scattered-back laser beams, which is based on the irregularity of the scattered light pattern.

Furthermore, irradiation by outside light or the light of other lidar sensors of motor vehicles may be detected and suppressed, for example, in light of other frequencies, pulse durations or the like. For example, band-pass filters and/or suitable coatings, e.g., at the exit aperture, which are only transparent to light of a particular wavelength, are used to this end. However, in this case, transmission of data between the sensors of different motor vehicles would also be possible, in principle, in order, for example, to improve the flow of traffic.

In the case of the laser light scattered back and received by the optical receiver and/or by an additional scattered light sensor, if an unusual deviation is detected, for example, back reflection due to fog, spray, or retroreflection by solar radiation, this may be detected by a further detection device and considered in the evaluation.

In addition, an ambient light detector, e.g., in the form of a brightness sensor, may be provided, in order to take into account the changed lighting conditions in response to, inter alia, entering a tunnel or an underground parking garage.

Also, a close-meshed grating of photosensitive resistive filaments is situated either at the exit aperture or on an intermediate plane, in order to check if the laser beam actually scans all of the desired monitoring regions during continuous operation. Consequently, it may be discerned if there are no gaps in the detection region.

In principle, it is possible, for example, to cause a change in thickness at the disk or lens of the exit aperture or at a disk in an intermediate plane, using the piezoelectric effect, in order to change the transmission behavior in this manner. This may also be a Fabry-Perot filter effect. Thus, only the desired wavelength may be preferentially received and other wavelengths are suppressed, even in the event of drift of the laser wavelength. This may also take place in a very narrow band. In the same way, it is also possible to detect and compensate for effects of wind gusts, other acoustic signals or the like on the transmitting or receiving devices of the laser beams as a function of the traveling speed of the motor vehicle, using a reverse piezoelectric effect at the exit aperture.

Furthermore, an ultrasonic sensor may be provided in or on or in addition to the 3-D lidar sensor, in order to allow further monitoring of the vehicle surroundings.

A temperature sensor may also be provided, which measures, for example, the ambient temperature and/or the temperature of the road surface, in order to take this into account during the signal evaluation.

In the same manner, a detector for radioactive emissions, which could affect the measurement results, could also be provided.

The disk or lens at the exit aperture may be configured to repel dirt, e.g., is formed so as to have a lotus-effect coating.

The 3-D lidar sensor may also be combined with a condensation sensor, in order, for example, to measure the condensation from rainwater, vapor or fog and to consider it during the evaluation of the measurement results.

It is also provided that the disk or lens at the exit aperture be manufactured to be particularly impact- and scratch-resistant, in order, for example, to withstand the impact of a stone. This may be accomplished, inter alia, by a diamond coating.

Finally, damage may be detected, for example, with the aid of integrated resistance measuring strips or strain gauges, in order to detect damage to the disk or lens of the exit aperture.

Expanding and/or focusing optics, e.g., in the form of a microlens array, for the emitted and/or scattered-back laser beams may also be situated in the interior of the 3-D lidar sensor, in order to increase the field angle.

A chemical detector, which detects, for example, the use of road salt, smog, or other environmental influences, may also be provided, in order to take these into account during the evaluation of the measurement results.

In the following, exemplary embodiments of the present invention are explained in further detail with reference to the drawings.

DETAILED DESCRIPTION

Figure 1:
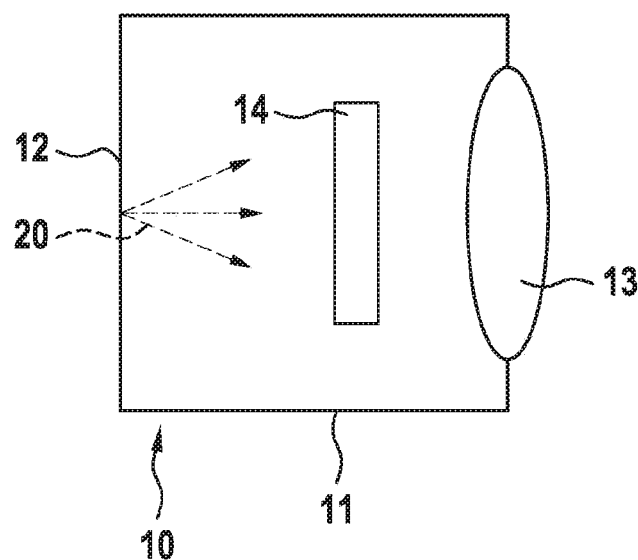
FIG. 1 shows a schematic of a 3-D lidar sensor.
Figure 1:
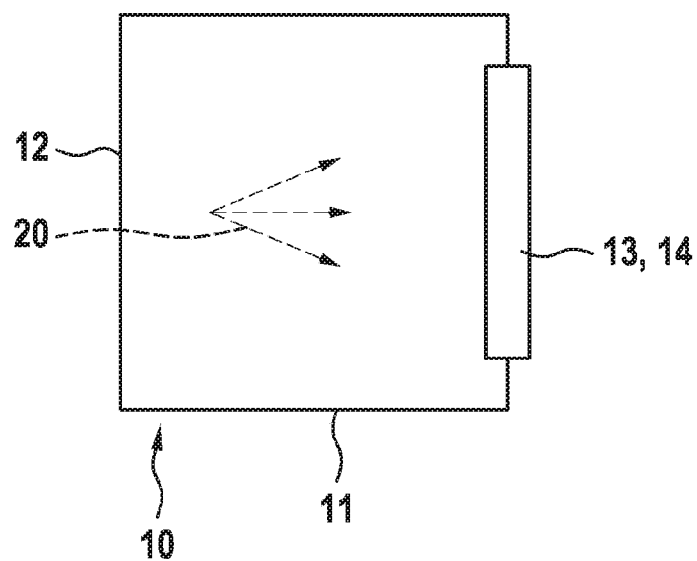

The 3-D lidar sensor 10 shown on the left side of FIG. 1 includes a laser beam source 11, which, as indicated by the different arrows, is configured to emit laser beams 20 in at least two spatial directions perpendicular to each other. In this manner, together with an optical receiver not shown here for the sake of simplifying the view, in particular, the surrounding area of a motor vehicle may be monitored. The 3-D lidar sensor includes a housing 12 and is situated, for example, on or in a body of a motor vehicle. Of course, it is equipped with an electric power supply, as well as with data transmission devices, in order to transmit measuring signals to a control device of the motor vehicle for further processing. In addition, a disk or lens 13 is situated on the housing, in order to allow laser beams 20 to emerge and possibly enter again. The present invention provides a further detection device 14, in this case, situated between laser beam source 11 and disk or lens 13, in order to increase the functionality of 3-D lidar sensor 10. As shown on the right side of FIG. 1, this detection device 14 may also be integrated in disk or lens 13.

A temperature sensor 28 may also be provided, which measures the ambient temperature and/or is configured to monitor a mirage effect, since, in particular, mirages on a hot road surface could affect the measurement results and/or their evaluation.

Figure 2:
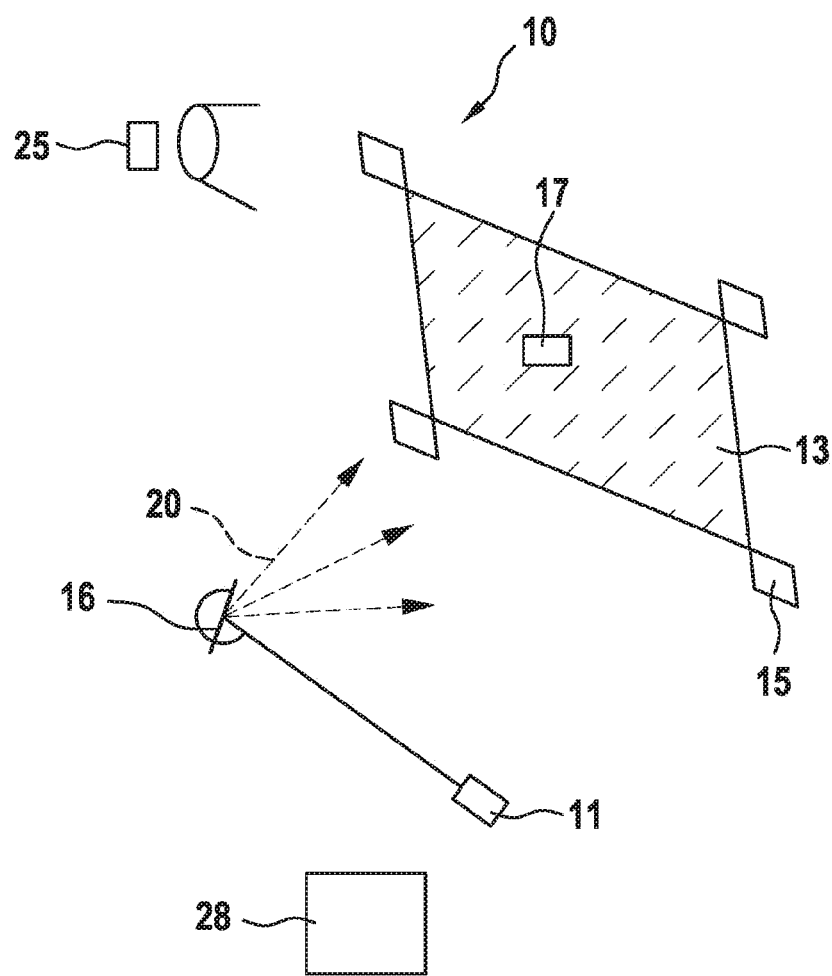
FIG. 2 shows the 3-D lidar sensor, along with additional sensors.

In FIG. 2, a laser beam source 11 is illustrated along with a mirror 16, which, as indicated by the double arrow, is able to swivel in two spatial directions perpendicular to each other, in order to illuminate a surrounding area of the motor vehicle. Laser beams 20 go through a disk or lens 13, out of the 3-D lidar sensor 10. Here, additional light sensors 15 are situated at the corners of disk or lens 13. If misalignment of the direction of laser beams 20 occurs due to thermal and/or mechanical and/or due to temporal changes, then the laser light is no longer aimed directly through disk or lens 13, but strikes a surrounding edge of housing 12. This is detected by light sensors 15, and self-calibration may be undertaken, and/or an error message may be outputted.

Of course, light sensors 15 may be situated not only at the corners, but also around the entire edge of disk or lens 13.

In addition, a scattered light sensor 25 is shown. This may determine, for example, that a laser beam 20 is being reflected directly by contamination 17 on disk or lens 13. Laser beam 20 is then no longer being used for monitoring the surrounding area, and an error message may be outputted.

Figure 3:
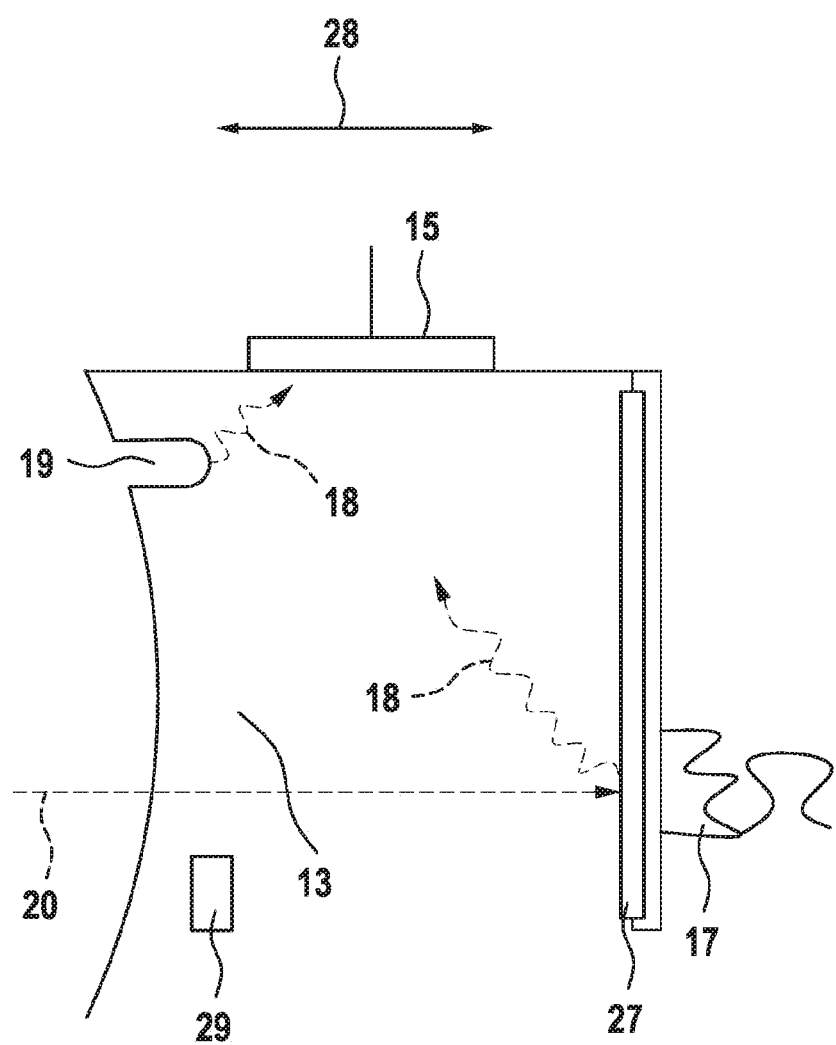
FIG. 3 shows a cross section of a disk or lens.

A cross section of a disk or lens 13 of a 3-D lidar sensor is depicted in FIG. 3. In this context, as an alternative, or in addition, light sensors are not only situated to be distributed around disk or lens 13, but are also situated on the edge of disk or lens 13. If a laser beam 20 strikes contamination 17, for example, it may be reflected inside of disk or lens 13 as scattered light 18. The same is true for damage 19 to disk or lens 13. This may be detected by the light sensors 15 at the edge of disk or lens 13. Contamination 17 may also be formed by drops of water, dew, condensation or the like, and may be detected. Temperature effects, chemical or radioactive effects from the environment may also be measured and considered in the evaluation. To that end, 3-D lidar sensor 10 may be equipped and/or networked with appropriate sensors.

Also, a rain drop or water drop and/or condensation from fog or dew, which affects the transmission behavior of entering and emerging laser beams, may equally be regarded as contamination 17.

In addition, a photoresistor 27 may also be provided, in order to measure the ambient light, which means that 3-D lidar sensor 10 may automatically determine that a tunnel, a parking garage or the like is being entered, in order to take into account the changed lighting conditions.

In addition to, or as an alternative to, photoresistor 17, a scratch-proof and/or lotus-type coating may also be provided.

Furthermore, additionally or alternatively, an environmental influence, such as road salt contamination, may be detected by a chemically sensitive coating.

As indicated by double arrow 28, the thickness of disk or lens 13 may also be adjusted, for example, with the aid of the piezoelectric effect, in order to obtain a desired transmission behavior for laser beams 20, for example, as a function of temperature and/or air pressure. In addition, the influence of sonic waves, air flow and the like on lens or disk 13 may be determined by piezoelectric measurement and taken into consideration in the evaluation.

Furthermore, e.g., scintillating atoms or molecules may also be introduced in disk or lens 13, as indicated by small box 29. These would be excited by radioactive emissions and emit light, which would be measured by appropriate detectors, for example, on the edge of disk or lens 13. Consequently, the effect of radioactive emissions may be determined and taken into account in the analysis.

Figure 4:
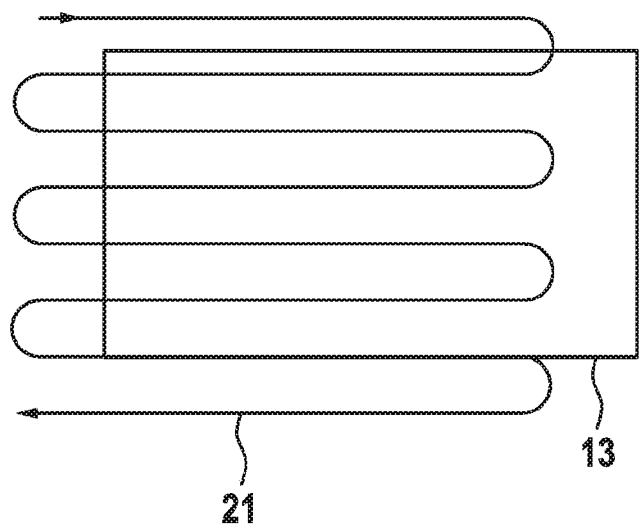
FIG. 4 shows the scanning path of a laser beam.

In FIG. 4, it is shown how a scanning path 21 of a laser beam 20 may be shifted across disk or lens 13 by arbitrary effects. This is determined, for example, by light sensors 15 and then readjusted accordingly.

Of course, disk or lens 13 may be provided, for example, with a lotus-type coating, a scratch-resistant coating and/or a coating for transmitting only certain wavelengths. The same applies to a component, which is situated in the interior of 3-D lidar sensor 10. In the same way, a band-pass filter and/or a photoresistor may be provided, for example, as an additional coating. Therefore, for example, laser beams of other motor vehicles may be prevented from entering, in order to prevent interference or other disturbances.

Figure 5:
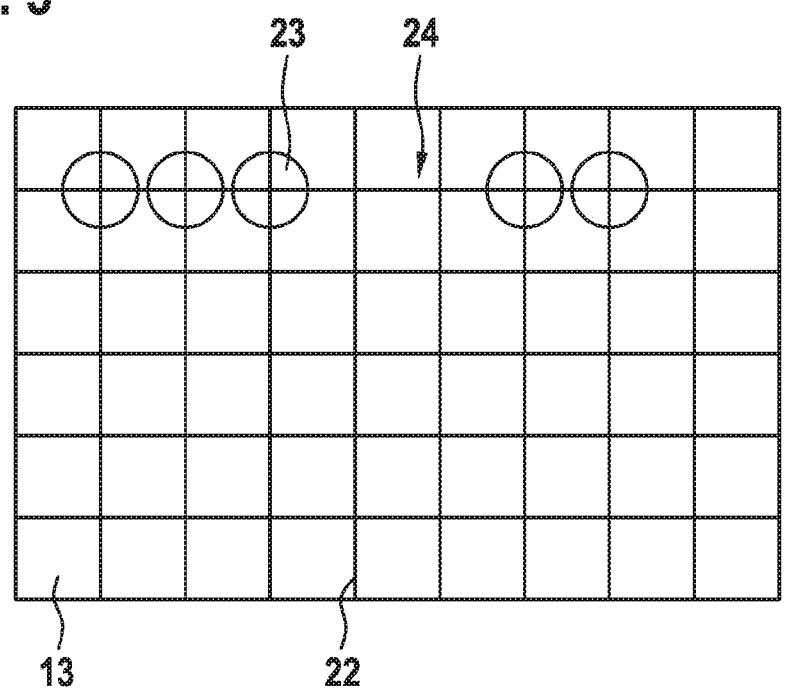
FIG. 5 shows a disk or lens having photosensitive resistance wires.

A disk or lens 13, on or in which photosensitive resistance wires 22 are situated, for example, in a netlike manner, is portrayed in FIG. 5. If a laser beam 20 strikes such a wire 22, then an electrical impulse illustrated by circle 23 is triggered. If, for example, a mechanical imperfection is formed in mirror 16 and a region 24 is not scanned by the laser beam, then the electrical signal is not generated, and an error message may be outputted.

Figure 6:
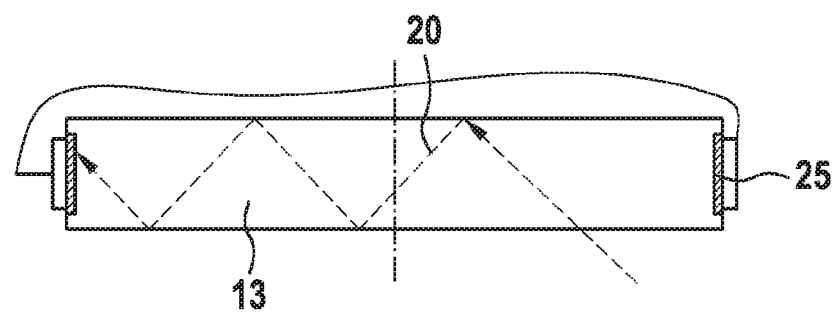
FIG. 6 shows a cross section of a disk or lens.

A cross section of a disk or lens 13 is depicted in FIG. 6. A band-pass filter, which may be circumferential, is situated on its edge, in order to filter out light beams 26 of an unwanted wavelength, that is, for example, of sensors of other motor vehicles, so that the measurement results are not corrupted. Only laser beams 20 of the reference 3-D lidar sensor 10 should be detected.

Figure 7:
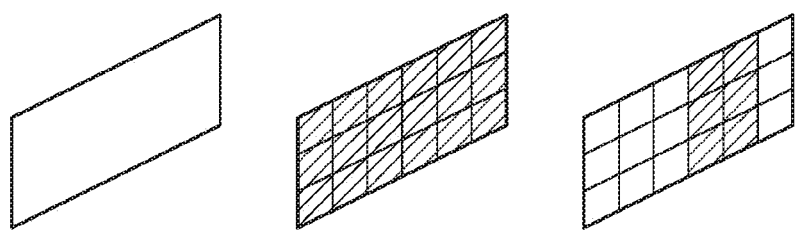
FIG. 7 shows an intermediate plane.

Three different embodiments of the so-called intelligent intermediate plane are shown in FIG. 7. The one on the left is transparent and allows, in particular, the reflected laser beams to pass through, as it were, unfiltered. In the middle, it is completely darkened and allows, for example, only light of a particular wavelength to pass through; and on the right, only a portion is darkened, in order, for example, to suppress unwanted incident light radiation in a concerted manner. This may be accomplished, using microarrays and/or photosensitive, controllable coatings.

Figure 8:
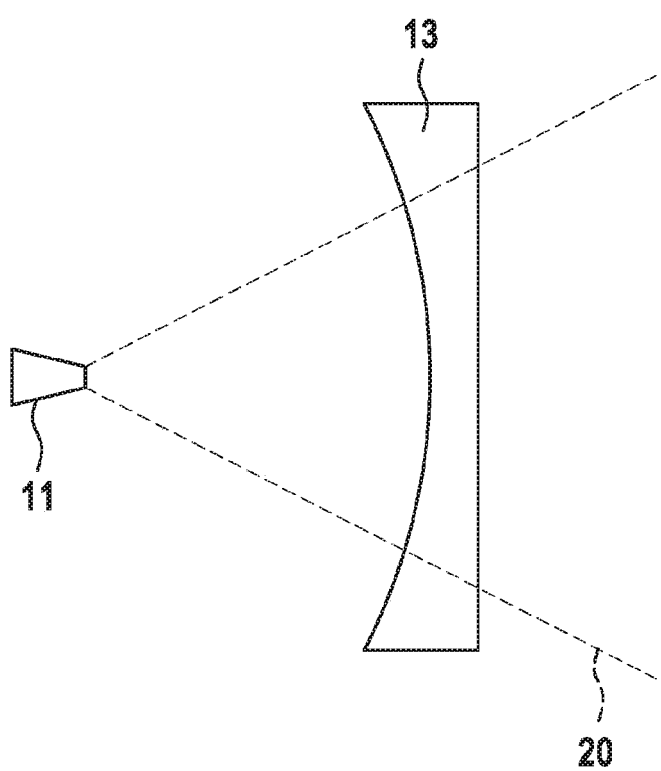
FIG. 8 shows expanding optics.

Finally, a disk or lens 13 having an expanding characteristic is illustrated in FIG. 8. The laser beams generated by a laser beam source 11 are expanded by disk or lens 13, in order to be able to cover a larger ambient region. In principle, a focusing embodiment is also possible.

What is claimed is:

1. A 3-D lidar sensor, comprising:
a laser beam source;
an optical receiver and a scanning system for deflecting a laser beam generated by the laser beam source in two scanning directions perpendicular to each other;
a further detection device for deviations from normal operation, and
additional light sensors, the additional light sensors being situated within a housing of the 3-D lidar sensor in such a way that: (i) the additional light sensors are not irradiated during normal operation of laser beam source and the scanning system, and (ii) at least one of the additional light sensors is irradiated when the laser beam source or the scanning system is misaligned.

2. The 3-D lidar sensor of claim 1, wherein outside light is suppressible.

3. The 3-D lidar sensor of claim 1, further comprising: a scattered light sensor.

4. The 3-D lidar sensor of claim 1, wherein the 3-D lidar sensor is coupled to at least one further sensor.

5. The 3-D lidar sensor of claim 1, further comprising: a piezoelectric system on or in a disk or lens at an exit aperture of the 3-D lidar sensor.

6. The 3-D lidar sensor of claim 1, further comprising: photosensitive resistance wires on or in a disk or lens at an exit aperture of the 3-D lidar sensor.

7. The 3-D lidar sensor of claim 1, further comprising: expanding and/or focusing for the laser beam.

8. The 3-D lidar sensor of claim 1, wherein the 3-D lidar sensor is coupled to at least one further sensor, including at least one of a rain sensor, a temperature sensor, an ultrasonic sensor, a chemical sensor and/or a radioactivity sensor.

9. The 3-D lidar sensor of claim 1, wherein the 3-D lidar sensor is for a vehicle.

10. The 3-D lidar sensor of claim 1, further comprising:
a disk or lens, the disk or lens is situated on the housing and is configured to allow laser beams to emerge from the housing of the 3-D sensor through the disk or lens;
wherein the additional light sensors are situated: (i) at an edge of the disk or lens, and/or (ii) at corners of the disk or lens.

11. The 3-D lidar sensor as recited in claim 10, wherein the 3-D lidar sensor is configured to output an error message or undertake a self-calibration, when the at least one of the additional light sensors is illuminated.

12. A method for operating a 3-D lidar sensor having a laser beam source, the method comprising:
deflecting, via an optical receiver and a scanning system of the 3-D lidar sensor for deflecting a laser beam generated by the laser beam source, in two scanning directions perpendicular to each other; and
ascertaining, via a further detection device of the 3-D lidar sensor, which is for deviations from normal operation, deviations from normal operation of the 3-D lidar sensor;
wherein additional light sensors are situated within a housing of the 3-D lidar sensor in such a way that: (i) the additional light sensors are not irradiated during normal operation of laser beam source and the scanning system, and (ii) at least one of the additional light sensors is irradiated when the laser beam source or the scanning system is misaligned, and the method further comprises:
outputting an error message or performing a self-calibration, the outputting or performing occurring when the at least one of the additional light sensors is irradiated.

13. The method as recited in claim 12, further comprising:
emitting the deflected laser beam from the housing through a disk or lens;
wherein the additional light sensors are situated: (i) at an edge of the disk or lens, and/or (ii) at corners of the disk or lens.

14. A 3-D lidar sensor, comprising:
a laser beam source;
an optical receiver and a scanning system for deflecting a laser beam generated by the laser beam source in two scanning directions perpendicular to each other;
a laser beam source;
an optical receiver and a scanning system for deflecting a laser beam generated by the laser beam source in two scanning directions perpendicular to each other; and
additional light sensors situated in such a way that: (i) the additional light sensors are irradiated during normal operation of laser beam source and the scanning system, and (ii) at least a specific portion of the additional light sensors is not irradiated when the laser beam source or the scanning system is misaligned.

15. The 3-D lidar sensor as recited in claim 14, further comprising:
- a disk or lens, the disk or lens is situated on a housing of the 3-D lidar sensor and is configured to allow laser beams to emerge from the housing of the 3-D sensor through the disk or lens;
- wherein the additional light sensors are photosensitive resistant wires on or in the disk or lens in a netlike manner.

16. The 3-D lidar sensor as recited in claim 15, wherein the 3-D lidar sensor is configured to output an error message when at least a specific region of the wires is not scanned by the deflected laser beam.

17. The 3-D lidar sensor as recited in claim 14, wherein the sensor is configured to output an error message when the at least a specific portion of the additional light sensors is not irradiated.

* * * * *